US005381402A

United States Patent [19]
Lee et al.

[11] Patent Number: 5,381,402
[45] Date of Patent: Jan. 10, 1995

[54] REMOVABLE DISK CARTRIDGE FOR USE WITH A ROTARY ACTUATED DISK DRIVE

[75] Inventors: Neville K. Lee, Sherborn; Amit Jain, Marlborough; Hisashi Katao, Shrewsbury, all of Mass.

[73] Assignee: Digital Equipment Corporation, Maynard, Mass.

[21] Appl. No.: 88,933

[22] Filed: Jul. 7, 1993

[51] Int. Cl.⁶ ............................................. G11B 23/03
[52] U.S. Cl. .................................... 369/291; 360/133
[58] Field of Search ................... 360/106, 133, 105; 369/291, 290, 282, 270; 206/444

[56] References Cited

U.S. PATENT DOCUMENTS

| | | | |
|---|---|---|---|
| 4,443,874 | 4/1984 | Steenberg | 360/133 |
| 4,477,894 | 10/1984 | Clurman | 369/270 |
| 4,488,190 | 12/1984 | Oishi et al. | 360/133 |
| 4,571,718 | 2/1986 | Cahill et al. | 369/291 |
| 4,586,102 | 4/1986 | Bresson | 360/133 |
| 4,646,285 | 2/1987 | Ogusu et al. | 369/291 |
| 4,714,973 | 12/1987 | Kato et al. | 360/133 |
| 4,717,981 | 1/1988 | Nigam et al. | 360/133 |
| 4,780,784 | 10/1988 | Covington et al. | 360/133 |
| 4,794,481 | 12/1988 | Suyama et al. | 360/99 |
| 4,797,770 | 1/1989 | Takahasi | 369/291 |
| 4,802,047 | 1/1989 | Tanaka et al. | 360/133 |
| 4,827,470 | 5/1989 | Odawara et al. | 360/133 |
| 4,891,722 | 1/1990 | Ekhoff | 360/106 |
| 4,908,817 | 3/1990 | Sandell et al. | 369/291 |
| 4,910,624 | 3/1990 | Peeters | 360/133 |
| 4,945,530 | 7/1990 | Sandell et al. | 369/291 |
| 5,008,874 | 4/1991 | Uehara | 369/75 |
| 5,058,094 | 10/1991 | Suzuki | 369/77 |
| 5,068,761 | 11/1991 | Inoue | 360/133 |
| 5,124,975 | 6/1992 | Naoki et al. | 369/291 |
| 5,141,103 | 8/1992 | Stephan | 206/444 |

FOREIGN PATENT DOCUMENTS

| | | | |
|---|---|---|---|
| 57-208676 | 12/1982 | Japan | 360/99.06 |
| 62-103888 | 5/1987 | Japan | 369/291 |
| 62-154390 | 7/1987 | Japan | 369/291 |

OTHER PUBLICATIONS

IBM Technical Disclosure Bulletin, "Disk Release Mechanism for Magnetic Disk Cartridge", M. H. Bosier, vol. 22, No. 6, Nov. 1979.

Primary Examiner—Robert S. Tupper
Assistant Examiner—David L. Ometz
Attorney, Agent, or Firm—Albert P. Cefalo; Dirk Brinkman

[57] ABSTRACT

A removable disk cartridge for use with a rotary actuated disk drive includes an enclosure having a top, a bottom, and a side connecting the top and bottom. The enclosure has a cutout formed by removal of a portion of the top, removal of a facing portion of the bottom, and removal of a portion of the side connecting the removed top and bottom portions. A disk is mounted for rotation inside the enclosure. The disk is exposed at a top surface, a bottom surface, and an edge. A door is pivotally mounted on the enclosure. The door has a top surface to shield the top surface of the disk, a lower surface to shield the bottom surface of the disk, and a side surface to shield the edge of the disk. The door has a closed position to fully seal the cutout, and the door has an open position to fully expose the cutout. Access to the top surface, bottom surface, and edge of the disk is provided by the exposed cutout.

16 Claims, 14 Drawing Sheets

FIG. 1

(PRIOR ART)

REMOVABLE DISK CARTRIDGE FOR USE WITH A ROTARY ACTUATED DISK DRIVE

FIELD OF THE INVENTION

This invention relates to disk cartridges, and more particularly to disk cartridges to be removably mounted in a disk drive.

BACKGROUND OF THE INVENTION

Figure 1:
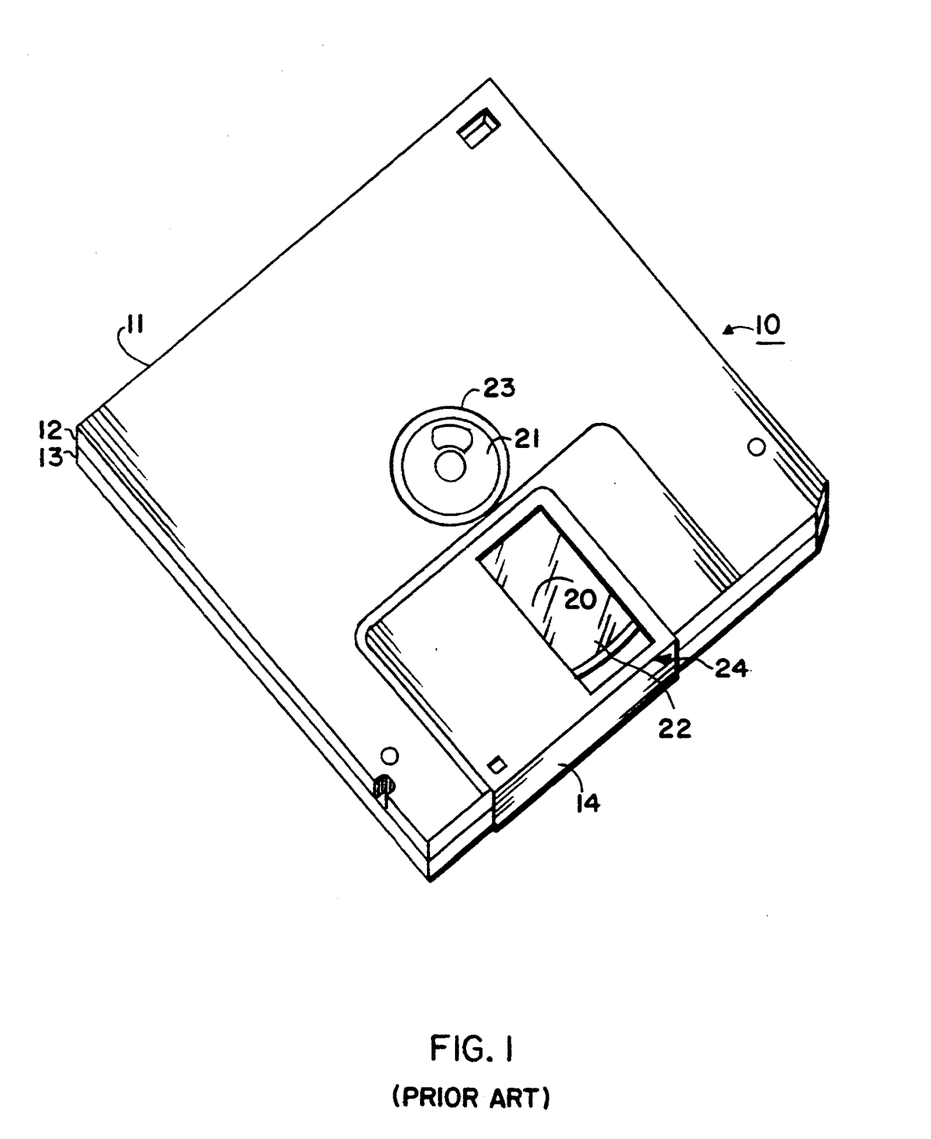
FIG. 1 is a top perspective view of a prior art disk cartridge for use with a disk drive having a linear actuator.

Many disk drives used with data processing systems are designed to accept small size removable disk cartridges. Shown in FIG. 1 is a typical prior art removable disk cartridge 10 which includes an enclosure 11 having mating top an bottom casings 12 and 13. A disk 20 is rotatably mounted within the enclosure. The disk can be made of either a rigid or flexible storage media. The disk has at least one recording surface 22. A hub 21, externally accessible via a throughhole 23 in the disk cartridge, is for removably connecting to an external disk spindle of a disk drive to enable the disk to be rotated.

A door mechanism 14 provides access to the interior of the disk cartridge for the read/write head of the disk drive when the disk cartridge is inserted in the disk drive. The door mechanism is normally closed when the disk cartridge is removed from the disk drive to seal the interior of the disk cartridge from dust and other contaminants which otherwise could enter the interior of the disk cartridge and possibly damage the delicate recording surface of the disk.

Most prior art removable disk cartridges are designed for use with disk drives having the read/write head mounted at a free end of a linear actuator. During operation of the disk drive, the spindle rotates the disk, and the actuator positions the read/write head in a straight line path next to the recording surface of the disk.

It would be an advantage to design a removable disk cartridge adapted for use with a disk drive having a rotary actuator. A rotary actuator generally has a lower inertia than a linear actuator and can therefore position the read/write head faster to decrease seek latency. However, the rotary actuator positions the read/write along an arcuate path. It is a problem to provide a simple to assemble door mechanism which provides access for the read/write heads of disk drives having rotary actuators without interfering with the pivotal motion of the actuator and read/write head, during head loading and loading, and while the disk is in operation.

It would also be an advantage to have a disk cartridge which provides lateral access to the disk without interference by the enclosure. For example, most known cartridges have a portion of the enclosure, generally indicated by numeral 24 in FIG. 1, which partially obstructs lateral access to the disk. The arms of the actuator have to be especially designed to fit around this obstruction.

It also is a problem to effectively seal the disk cartridge in the general area of the throughhole 23 when the disk cartridge is removed from the disk drive. This is particularly true for disk cartridges which store data at higher recording densities, for example, data recorded with optical recording techniques. When data are recorded at higher densities, contamination on the recording surface is more likely to interfere with the correct operation of the cartridge.

SUMMARY OF THE INVENTION

The present invention provides a removable disk cartridge which can be used with a disk drive having a rotary actuator. The cartridge provides full access to the disk, not only to the top and bottom surfaces of the disk, but also laterally to simplify actuator design. Furthermore, the cartridge is environmentally sealed, to exclude contaminants, when not in use.

The disk cartridge includes an enclosure having a top, a bottom, and a side connecting said top and bottom. The top, bottom and side of the enclosure are formed b) mating top and bottom casings. The enclosure has a cutout formed by removal of a portion of the top, removal of a facing portion of the bottom, and removal of a portion of the side connecting the removed top and bottom portions of the enclosure.

A disk is mounted for rotation inside the enclosure. The disk is exposed at a top surface, a bottom surface, and an edge within the cutout for read and write access, when in use.

A U-shaped door is pivotally mounted on the enclosure, the door has a top surface, to shield the top surface of the disk, a lower surface to shield the bottom surface of the disk, and a side surface to shield the edge of the disk. The door has a closed position to fully seal the cutout, and the door has an open position to fully expose the cutout, access to the top surface, bottom surface, and edge of the disk is provided by the exposed cutout.

During operation of the cartridge, the door is retracted inside the enclosure. When the cartridge is not in operation, the door and enclosure effectively seal the interior of the enclosure. The cartridge includes a locking mechanism for maintaining the door in the closed position. The locking mechanism includes a movable spring-loaded lever having a hook at one end. The lever is pivotally mounted inside the door. A fixed latch is formed on an interior surface of the enclosure. The hook is engaged with the latch when the door in the closed position.

Furthermore, the enclosure includes an access hole for receiving a spindle to rotate the disk. The access hole is surrounded by an annular permanent magnet, and a ferrous-metal washer is mounted on a central portion of one side surface of the disk. The magnet attract the washer to seal the interior of the enclosure when the cartridge is not in use.

The disk drive for receiving the cartridge is equipped with a rotary actuator. The actuator has a read/write head at one free end. The rotary actuator positions the read/write head along an arcuate path. Furthermore, the disk drive includes a guide plate for positioning the cartridge relative to the actuator. An operating arm is pivotally mounted on the guide plate. The operating arm includes a pin mounted at a free end, the pin engages with the locking mechanism when the cartridge is inserted in the disk drive to unlock and open the door.

BRIEF DESCRIPTION OF THE DRAWINGS

These and other features and advantages of the present invention will become apparent from a reading of the detailed description in conjunction with the attached drawings, wherein.

DETAILED DESCRIPTION OF THE PREFERRED EMBODIMENT

Figure 2:
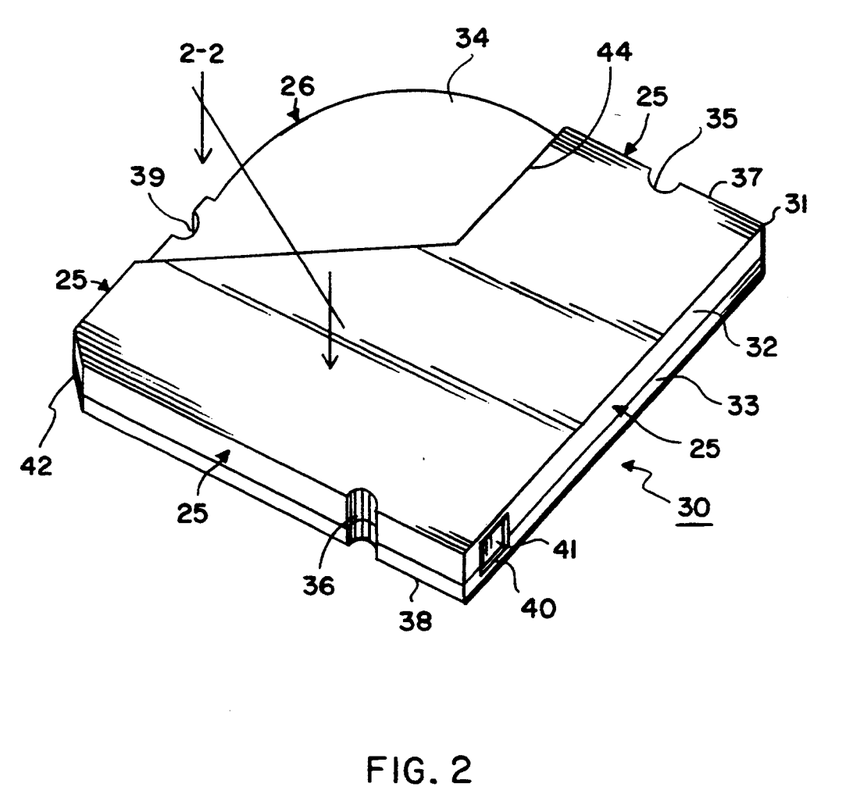
FIG. 2 is a top perspective vive of a disk cartridge for use with a disk drive having a rotary actuator.
Figure 3:
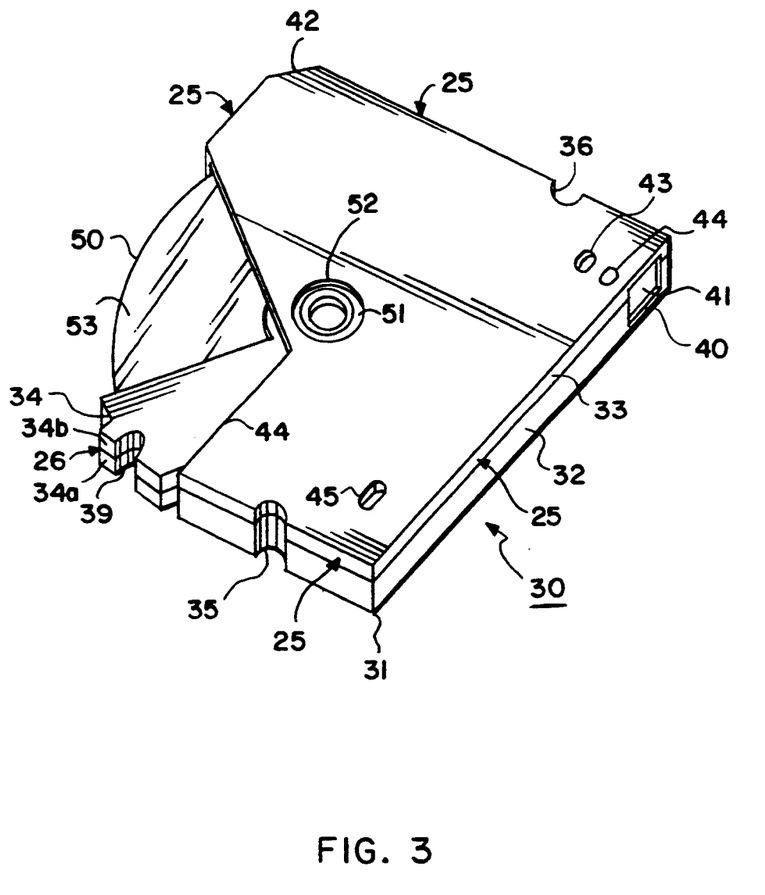
FIG. 3 is a bottom perspective vive of the disk cartridge.

FIGS. 2 and 3 show respectively, top and bottom perspective views of a disk cartridge 30 according to the preferred embodiment of the invention. The cartridge 30 includes an enclosure 31 having mating top and bottom casings 32 and 33. The enclosure 31 is shaped generally rectangularly. Note, the casings 32 and 33, although generally symmetrical in shape, have unequal thicknesses, with the top casing 32 being substantially thicker than the bottom casing 33. The casings 32 and 33 can be made, for example, of a molded plastic. The top and bottom casings 32 and 33, when mated with each other, form the top, bottom, and side 25 of the enclosure. The side 25 connects the peripheral edges of the top and bottom of the enclosure 31.

The cartridge 30 also includes a pivotally mounted door 34. FIG. 2 shows the door 34 in a closed position, and FIG. 3 shows the door 34 in an open position. The door 34 is supported for pivoting at about the approximate center of the cartridge 30. The door 34 is generally pie-shaped with a U-shaped cross section. The door 34 includes generally symmetrical top and bottom portion 34a and 34b. The door 34 can also be made of a molded plastic. The portions 34a and 34b when mated together form a top and bottom surface of the door 34, as well as a side surface 26. The side surface 26 connects the top and bottom surfaces of the door 34.

Figure 4:
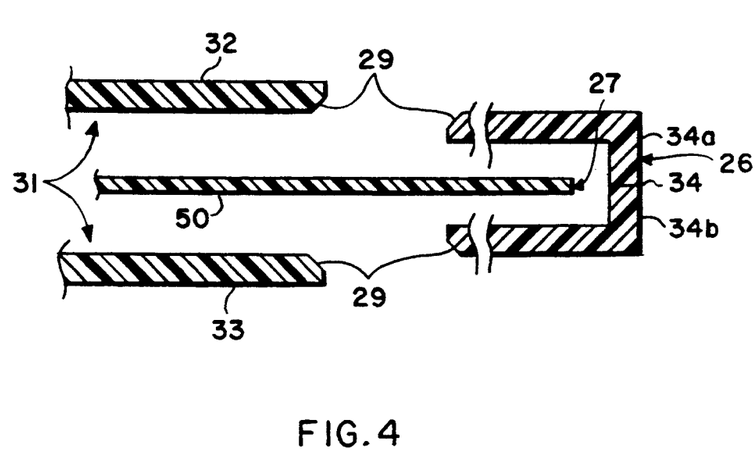
FIGS. 4 and 5 are cross-sectional views of the disk cartridge, partially cut-away taken along line 2—2 of FIG. 2.
Figure 5:
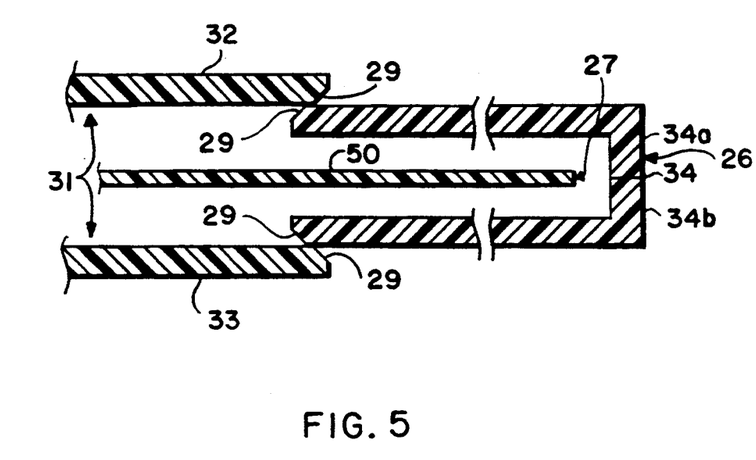

Briefly referring to FIGS. 4 and 5, the internal clearance thickness of the enclosure 31 is marginally greater than the external thickness of the door 34. Thus the door 34 can be retracted within the enclosure 34 when the door 34 is opened, yet the exterior surface of the door 34 and the interior surface of the enclosure 31 provide a snug fit when the door 34 is in the closed position to exclude contaminants from the interior of the enclosure 31 when the cartridge 30 is not in operation. The door 34 and the enclosure 31 overlap by about 2 millimeters when the door 34 is in the closed position. Because of the close tolerance on the fit between the enclosure 31 and the door 34, the leading edges 29 of the enclosure 31 and the door 34 are chamfered to facilitate the door 34 to easily slide into the enclosure 31 without interference with the enclosure 31.

Now again with reference to FIGS. 2 and 3. Notches 35 and 36 are formed in opposing sides 37 and 38 of the enclosure 31, respectively. The notches 35 and 36 are shaped generally semicircularly. The notches 35 and 36 are used to properly position the cartridge when inserted in a disk drive. A semicircular notch 39 is also formed in the side surface 26 of the door 34. A plurality of detents 43 and 45 are formed in the bottom casing 33, for positioning the cartridge 30 while in use.

The enclosure 31 includes a rectangular window 40 having a covering plate 41. The window is used to engage with a conventional write protect interlock mechanism as is typically found in disk cartridges. That is, the data are protected from erasure, when the covering plate is, for example, in a closed position, and data can be over-written when the covering plate 41 is, for example, in an open position.

One front corner 42 of the enclosure 31 is bevelled to ensure proper orientation of the cartridge 30 when it is inserted in a disk drive. The enclosure 31 also includes a cutout 44, the cutout 44 is formed by removal of facing portions of the top and bottom casings 32 and 33. The cutout 44 fully exposes the interior of the enclosure 31 when the door 34 is in the open position. It should be noted that the cutout 44 provides direct access to the interior of the cartridge, not only from the top and bottom, but also laterally. The cutout 44 is also shaped as a segment of a circle, sized and arranged to coincide with the size and placement of the door 34 so that when the door 34 is closed the edges of the enclosure 31 adjacent to the cutout 44 overlap the edges of the door 34. The cutout 44 fully exposes about a quarter of the interior of the cartridge 30 when the door 34 is open.

As is shown in FIG. 3 a disk 50 having an edge 27 is mounted for rotation inside the enclosure 30. The disk 50 can be made of a rigid or flexible recording media, typically having recording surfaces 53 on a top and bottom surface thereof. Data can be recorded on the recording surfaces 53 using any of the well known data recording methods such as magnetic, optical, or magneto-optical encoding techniques. Typically, the data are recorded by read/write heads of a disk drive. During the operation, the read/write heads are positioned adjacent to the top and bottom recording surfaces 53 by an actuator assembly, see FIG. 10.

The center of the disk 50 is externally accessible via an access hole 52. The center of the disk 50 is for engaging with an external disk spindle, of the disk drive, see FIG. 13. During operation, the disk 50 is freely rotated inside the enclosure 31, and partially inside the opened door 34.

Figure 6:
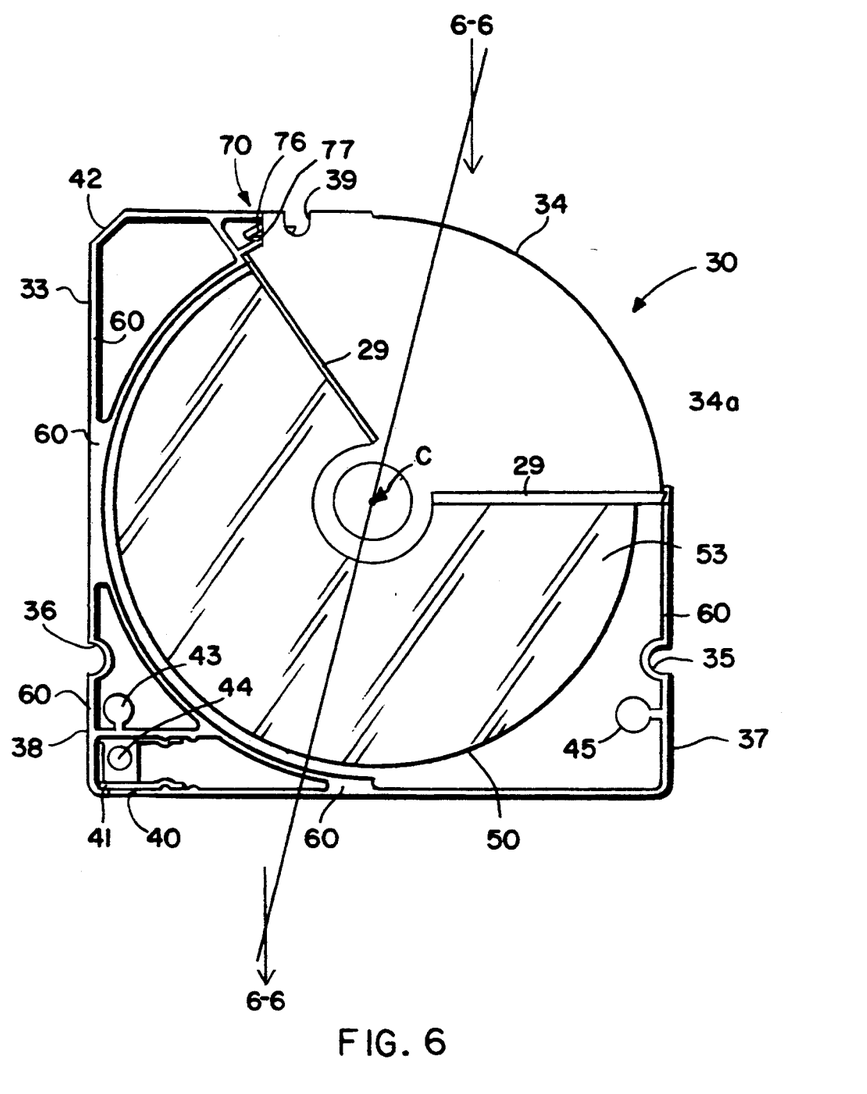
FIGS. 6 and 7 are top plan views of the interior of the disk cartridge of FIG. 2.
Figure 7:
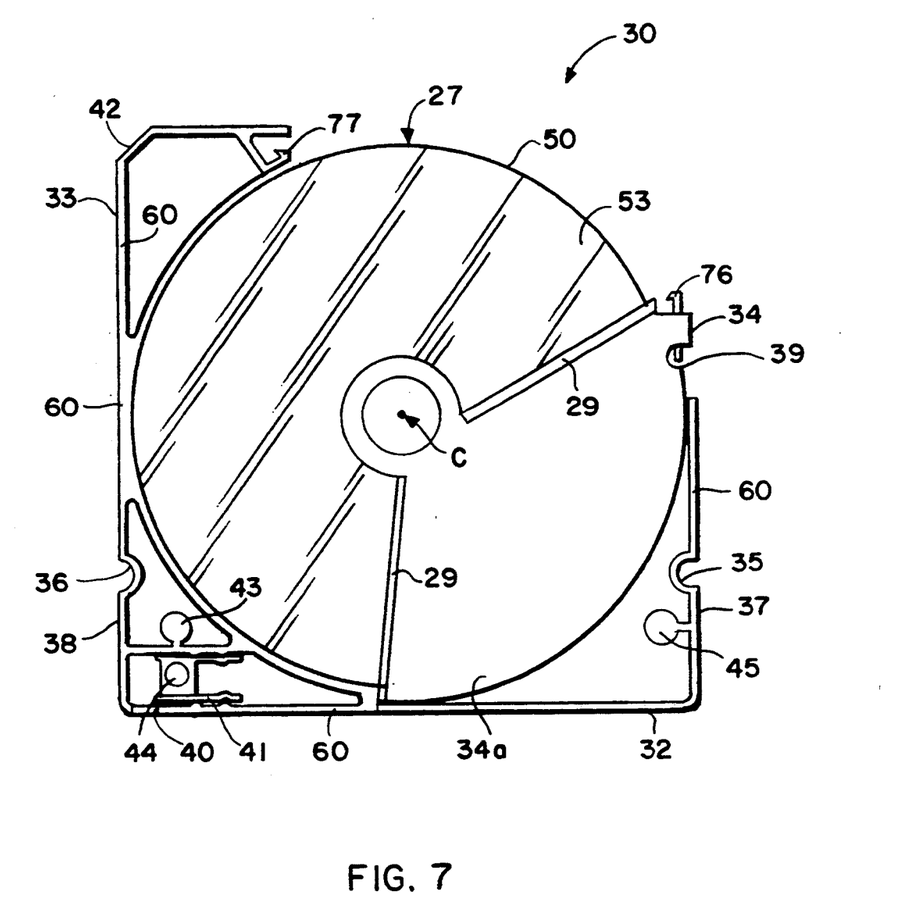

FIGS. 6 and 7 are top plan views of the disk cartridge 30 with the top casing 32 removed for viewing the interior of the cartridge 30. FIG. 6 shows the disk cartridge 30 with the door 34 and the window 40 in the closed position, and FIG. 7 shows the cartridge 30 with the door 34 and window 40 in the open position. A plurality of ribs 60 are formed along the peripheral edges and the interior portions of the bottom casing 33. The ribs 60 mate with symmetrically placed ribs along the peripheral edge and the interior portions of the top casing 32 to provide rigidity to the enclosure 31, and to seal the interior of the enclosure 31 from external contaminants when the disk cartridge 30 is assembled.

The door 34 is mounted for pivoting about an axis C substantially coincident with the axis of rotation of the disk 50. Positioned inside cartridge 30 is a door locking, mechanism 70. The locking mechanism includes a hook 76 mounted inside the door 34 for engaging with a latch 77 mounted on the enclosure 31.

Figure 8:
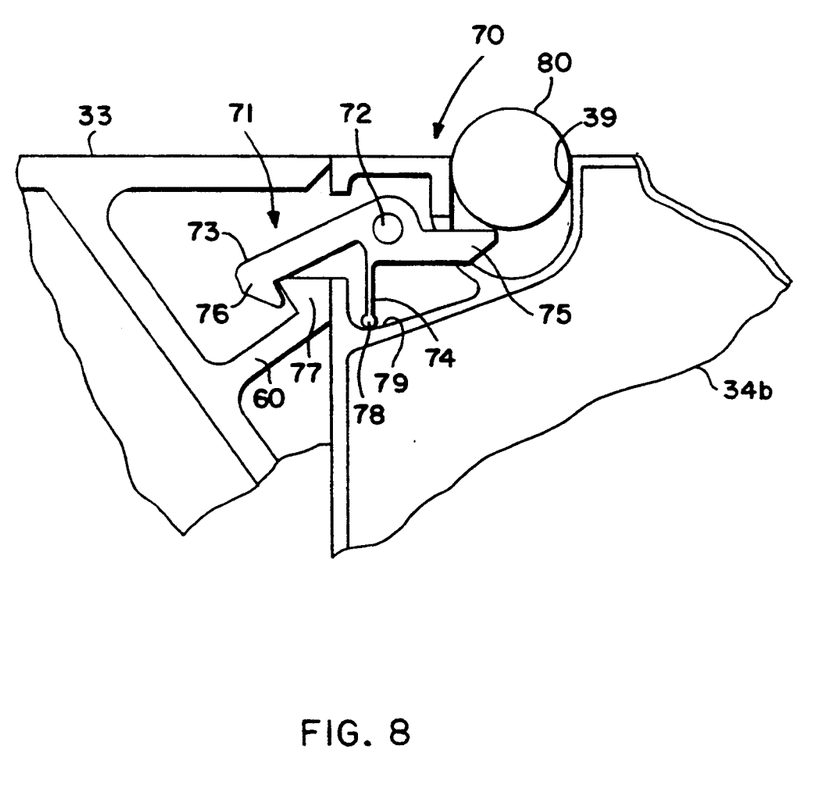
FIGS. 8 and 9 are top plan views partially cut-away of the interior of the disk cartridge showing a door locking mechanism.
Figure 9:
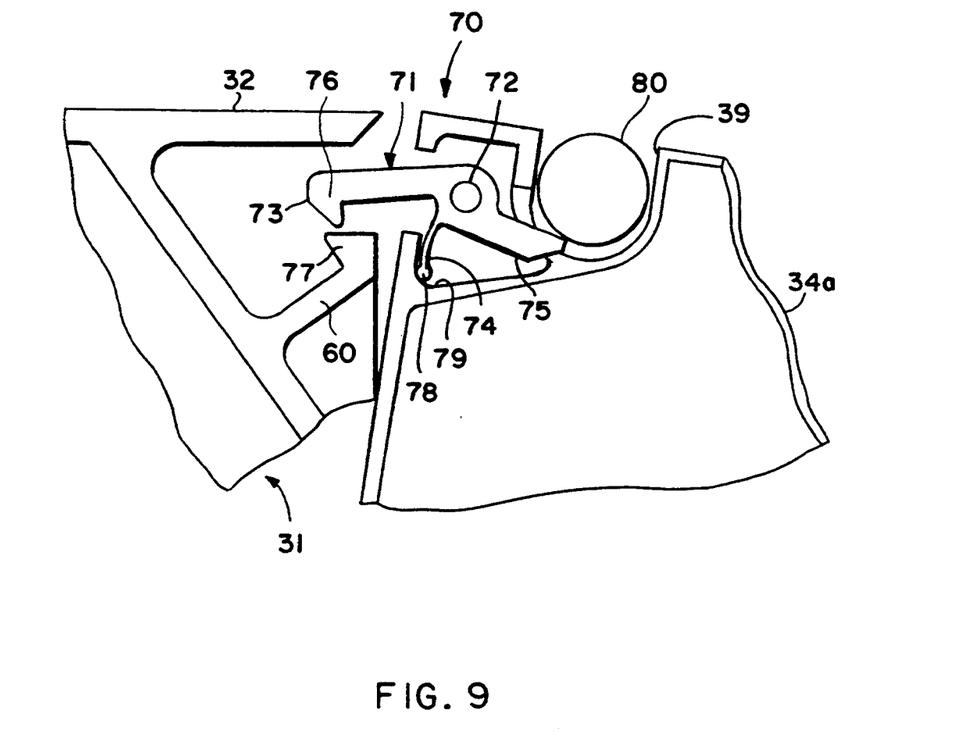

FIGS. 8 and 9 have the top portion 34a of the door 34 removed to show the locking mechanism 70 in greater detail. A lever 71 is pivotally mounted about a shaft 72 on the interior portion of the door 34. The lever 71 includes a first arm 73, a second arm 74 and a third arm 75. The first arm 73 terminates in the hook 76 for engaging with the latch 77 formed in one of the ribs 60 of the enclosure 31. The second arm 74 terminates in a rounded end 78 fitted in a rounded notch 79. The second arm 74 is made flexible to act as a spring for urging the hook 76 to engage with the latch 77 when the door 34 is in the closed position. The third arm 75 is externally accessible via the door notch 39 by an external unlock pin 80. The external unlock pin 80 is described in further detail with reference to FIGS. 10–12.

During operation, when the disk cartridge 30 is inserted in a disk drive, the unlock pin 80 of the disk drive is fitted in the notch 39 to engage with the operating arm 75. As the cartridge 30 is pushed further into the drive, the force stored in the arm 74 is overcome to allow the lever to pivot about the shaft 72, disengaging the hook 78 from the latch 77. Pushing the cartridge yet further into the drive causes the now unlocked door 34 to become open, as shown in FIG. 9.

Figure 10:
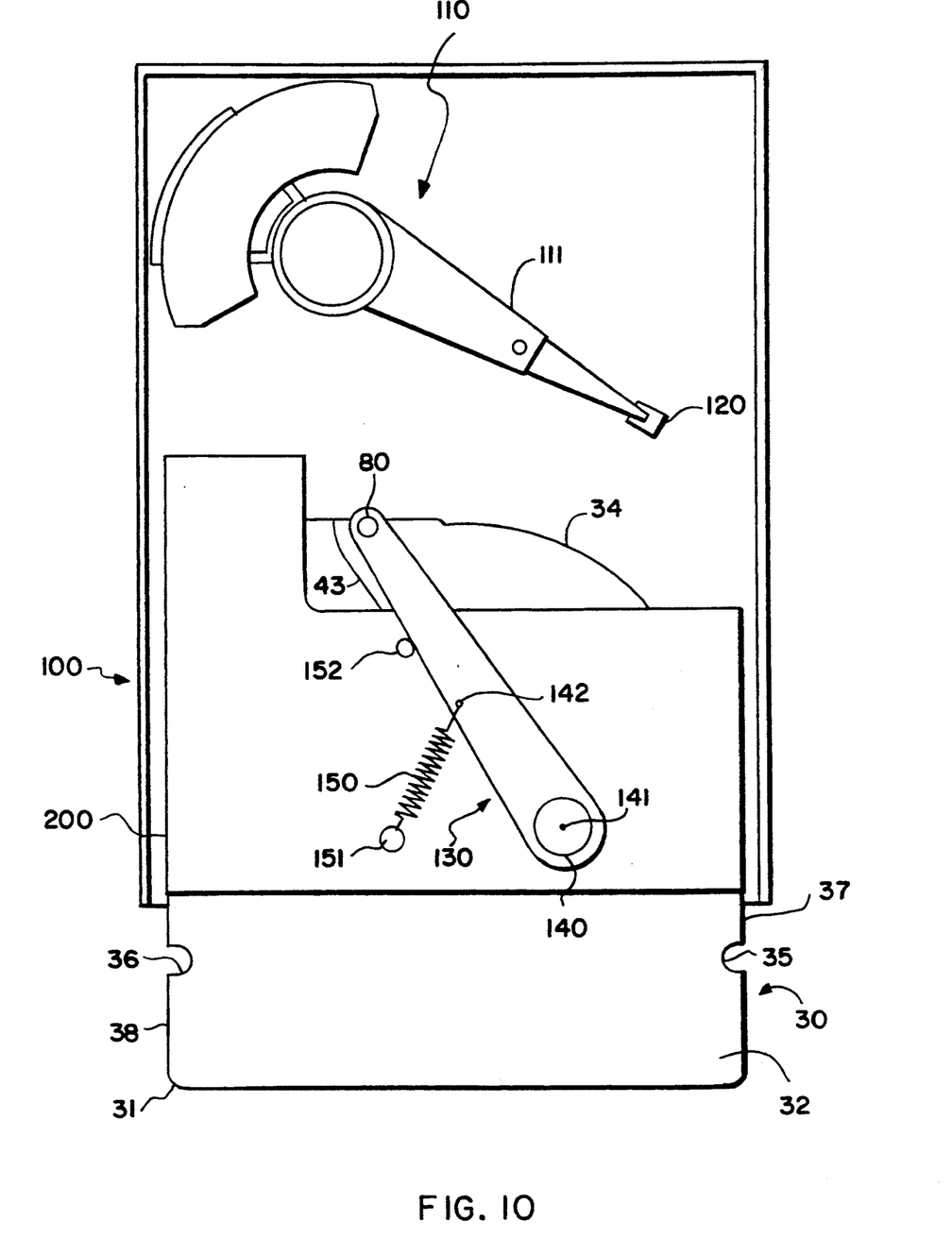
FIGS. 10 and 11 are top plan views of the disk cartridge with a disk drive having a rotary actuator.

FIG. 10 shows the disk cartridge 30 partially inserted in a disk drive 100 having a rotary actuator assembly 110 for positioning the read/write heads 120 adjacent to the recording surfaces 53 of the disk 50. Note, that only one of the heads 120 is visible, the other head being positioned directly below the top head. The read/write heads 120 are mounted at the free end of arms 111 of the actuator assembly 110.

Figure 11:
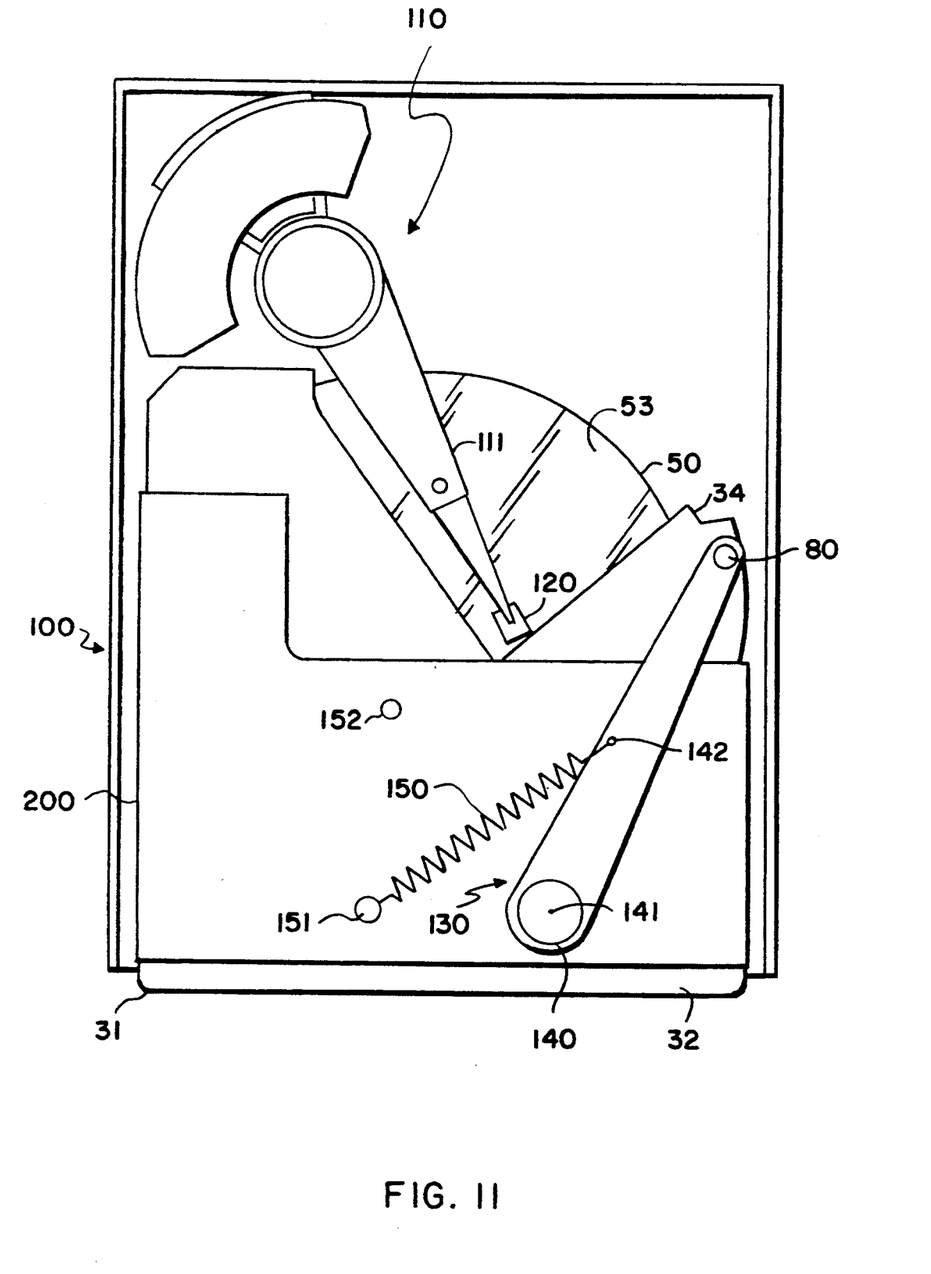

FIG. 11 shows the disk cartridge 30 fully inserted in the disk drive 100, with the door 34 in the open position and the read/write heads 120 positioned adjacent to the recording surfaces 53. Also, shown is an opening lever 130 having the unlock pin 80 for engaging with the locking mechanism 70, and a guide plate 200. The guide plate 200 ensures proper alignment of the cartridge 30 during insertion.

The lever 130 is pivotally mounted about a shaft 140. One end of a spring 150 is attached to a middle portion of the lever 130, and the other end of the spring 150 is attached to a spring pin 151 mounted on the guide plate 200. The spring 150 urges the lever 130 against a stopper pin 152 mounted on the guide plate 200 when the cartridge is not inserted in the disk drive 100. The stopper pin 152 is positioned on the guide plate so that the pin 80 at the free end of the lever 130 is in-line with the notch 39 of the door 34 of the cartridge 30 when the cartridge 30 is pushed into the disk drive 100.

When the cartridge 30 is inserted in the disk drive 100, as shown in FIG. 11, the inward movement of the disk cartridge 30 causes the pin 80 to disengage the locking mechanism 70 as described above, and then to swing the lever 130 about the shaft 140 to open the door 34 while stretching the spring 150.

When the door 34 is fully opened, the read/write heads 120 can be loaded adjacent to the recording surfaces 53 by moving the arms 111 along an arcuate path. Note, the shape of the cutout 44 provides access to the disk 50 without interference, during loading and unloading. Also, while the cartridge 30 is in operation the heads 120 can be freely positioned to access the recording surfaces 53 of the disk 50 for reading and writing data.

Upon completion of operation, the actuator assembly 100 is unloaded from the disk 50, and the disk cartridge 30 may be removed from the disk drive 100. Removing the disk cartridge from the disk drive 100 releases the stored force in the stretched spring 150 to urge the lever 130 to return to its original position against the stopper pin 152 while closing the door 34.

Figure 12:
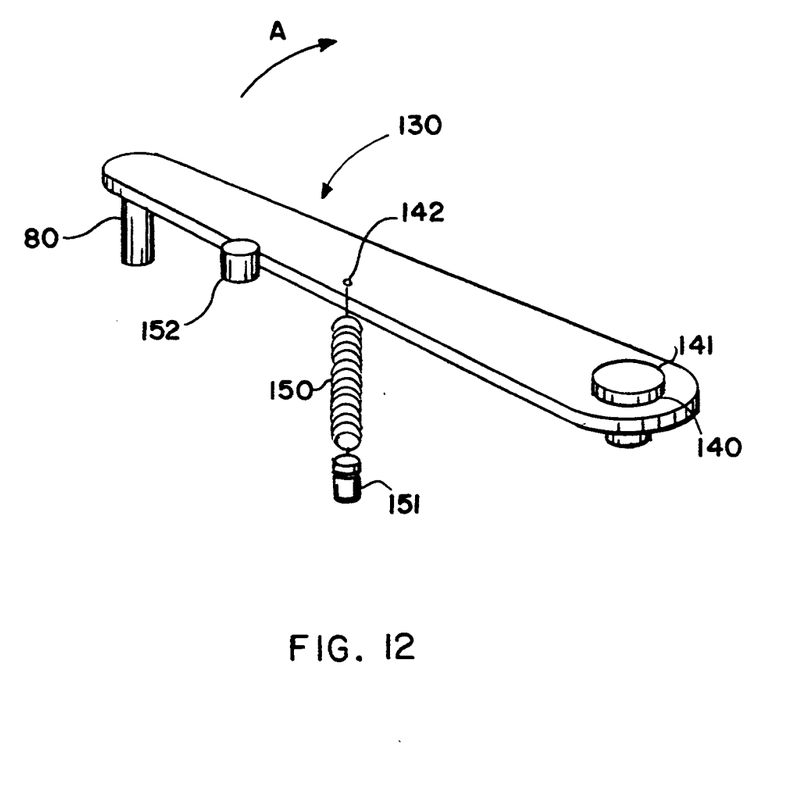
FIG. 12 is a perspective view of an opening lever.

FIG. 12 shows the opening lever mechanism in greater detail. The lever 130 has the pin 80 mounted at a free end, and a throughhole 140 fitted with a shaft 141. A small throughhole 142 in the approximate middle of the lever 130 receives one end of the spring 150. The general direction of movement of the lever 130 is shown by directed arrow A.

Figure 13:
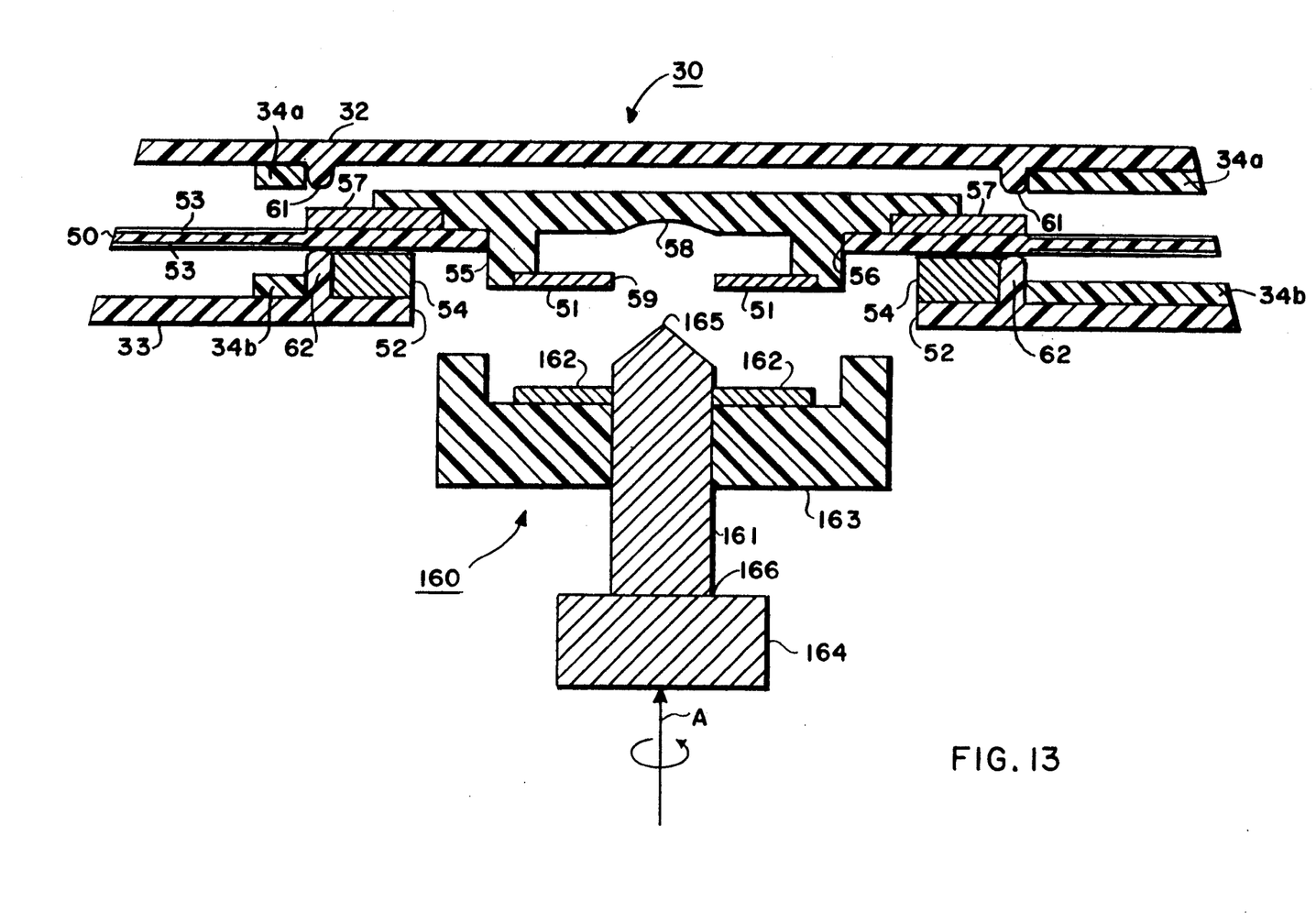
FIGS. 13 and 14 are cross sectional views of the disk cartridge taken along line 6—6 of FIG. 6.
Figure 14:
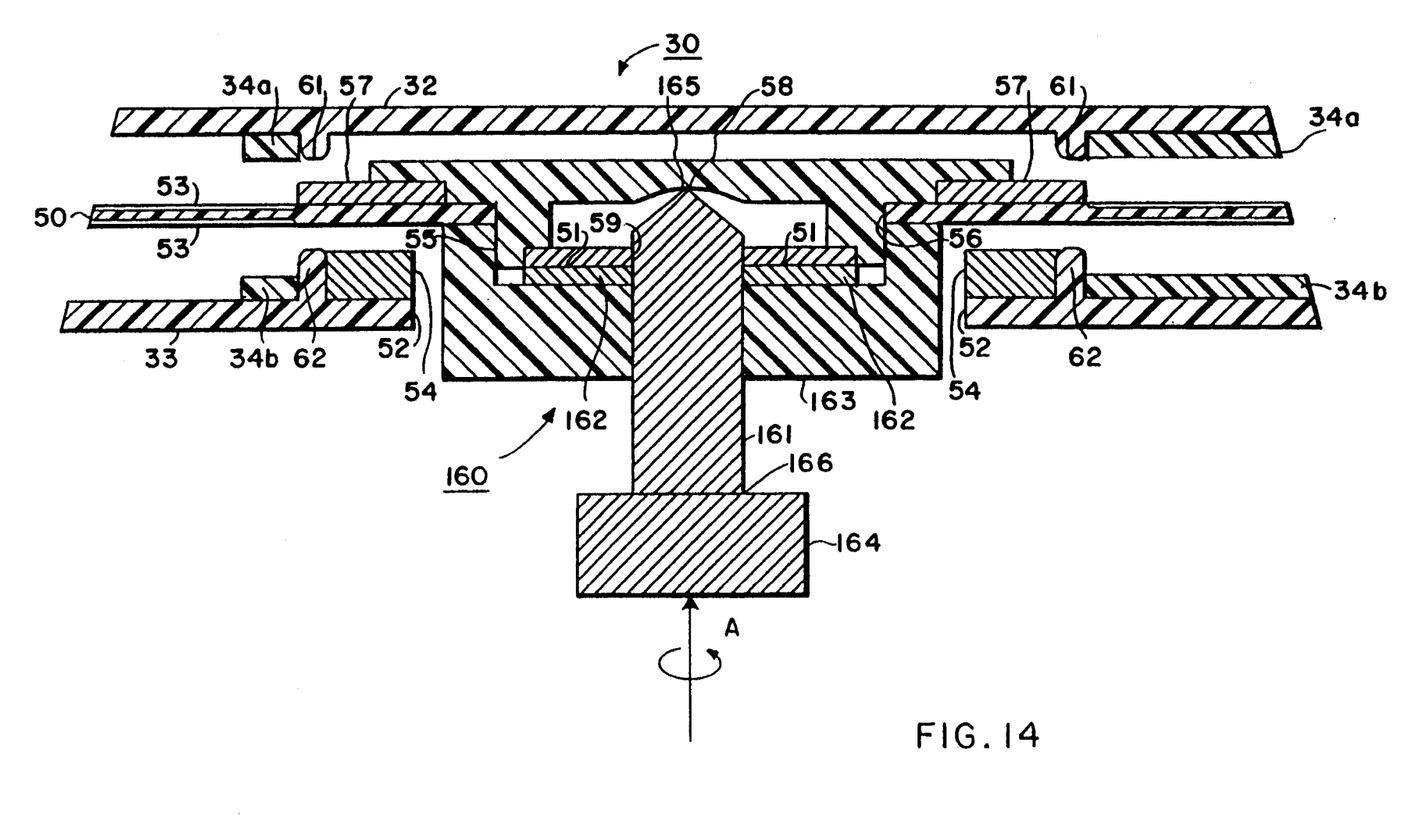

Now turning to FIGS. 13 and 14, there are shown, in cross section, the central portion of the disk cartridge 30 and a spindle assembly 160. FIG. 13 shows the cartridge 30 not in use, and FIG. 14 shows the disk cartridge 30 engaged with the spindle assembly 160.

The spindle assembly 160 includes a spindle shaft 161 having one free finished in a tapered end 165, and the other end 166 attached to a spindle motor 164 for rotation. Mounted about the shaft 161, near the free end 165, is a flange 163 and an annular spindle magnet 162.

The interior features of the cartridge 30 include a top annular rib 61 formed on the inside surface of the top casing 32, and a bottom annular rib 62 formed on the inside surface of the bottom casing 33. The annular ribs 61 and 62 can be molded, and have a semicircular profile. The ribs 61 and 62 are used to properly position the pivotally mounted doors within the enclosure 31.

An annular cartridge magnet 54 is fixed to the bottom casing 33. The permanent magnet 54 completely surrounds the access hole 52 and is fitted inside the bottom rib 62. The central portion of the disk 50 includes a plug 55 fitted in a throughhole 56 of the disk 50. The plug 50 is made of, for example, plastic. The center portion of the plug 55 includes a dimple 58. The dimple 58 is formed on the side of the plug 54 facing the spindle assembly 160. A first steel washer 57 is fixed to the disk 50 on the side surface of the disk 50 facing the first annular rib 61. The first washer 57 is partially fitted between the plug 55 and the disk 50.

A second steel washer 51 is fixed to the side of the plug 55 facing the access hole 52 of the cartridge 30. The throughhole 59 of the second washer 51 is for receiving the spindle shaft 161 when the cartridge is inserted in the disk drive 100, and the washer 51 is about equal in size to the spindle magnet 162.

When the cartridge is not in use, as is shown in FIG. 13, the cartridge magnet 54 magnetically attracts the first washer 57, urging the bottom surface of the disk 50 against the second rib 62 to environmentally seal the interior portion of the cartridge 30. Thus, with the door 34 is in the closed position, and the access hole 53 sealed, dust and other contaminants can be effectively excluded from the interior of the cartridge 30.

FIG. 14 shows the cartridge 30 in use, with the disk 50 engaged with the spindle assembly 160 for rotation. When the cartridge 30 is placed in operation, the spindle assembly 160 is moved in a direction towards the disk 50, as generally indicated by arrow A.

Figure 15:
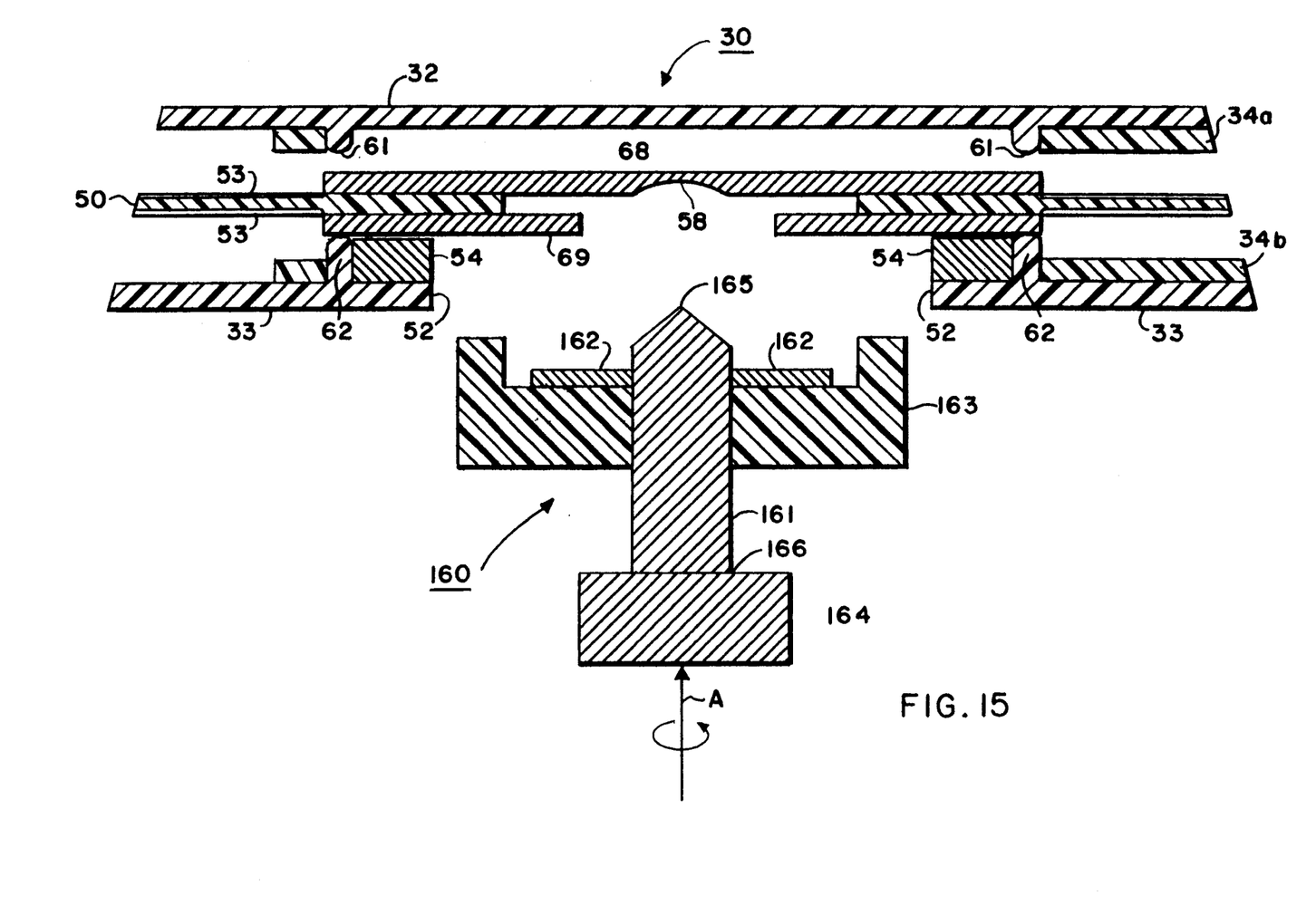
FIG. 15 is a cross sectional view of an alternative embodiment of the disk cartridge.

The upward movement of the spindle assembly 160 breaks the magnetic attraction between the cartridge magnet 54 and the first washer 57, while the second washer 51 is magnetically attracted to the spindle magnet 162. While the disk 50 is rotating, the disk 50 is supported by the flange 163 to freely rotate within the cartridge 30. An alternative arrangement is shown in FIG. 15, where a circular steel plate 68 is fixed to the top surface of the disk 50, and a steel washer 69 is fixed to the bottom surface of the disk 50. In principle, the arrangement shown in FIG. 15 operates similarly to the one shown in FIGS. 13 and 14. During operation, the washer 69 is used to magnetically engage ,with the spindle assembly 160. When the cartridge 30 is not in use, the washer 69 is magnetically attracted by the cartridge magnet 54 to seal the access hole 52.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. A disk cartridge, comprising:

an enclosure having a top, a bottom, and a side, said side connecting said top and bottom, said enclosure having a cutout formed by removal of a segment shaped portion of said top, removal of a facing segment shaped portion of said bottom, and removal of a portion of said side connecting said removed top portion and said removed bottom portion, a fixed latch formed on an interior surface of said enclosure, said enclosure made of a top casing and a bottom casing, said top and bottom casing substantially symmetrical in length and width, said top and bottom casing fixed to each other to form said enclosure, said bottom casing includes a centrally located access hole for receiving a spindle, said access hole surrounded by an annular permanent magnet and an annular rib;

a disk mounted for rotation inside said enclosure, said disk rotated by said spindle, said disk exposed at a top surface, a bottom surface, and an edge within said cutout, a ferrous-metal washer mounted on a central portion of one side surface of said disk opposing said annular magnet, said washer attracted by said annular magnet to seal said enclosure when said cartridge is not in operation;

a door pivotally mounted inside said enclosure on an axis approximately coincident with the axis of rotation of said disk, said door generally U-shaped in cross section and said door generally segment shaped in planar section, said door having a top surface to shield said top surface of said disk, a lower surface to shield said bottom surface of said disk, and a side surface to shield said edge of said disk, said door having a closed position to fully seal said cutout, and said door having an open position to fully expose said cutout, access to said top surface, said bottom surface, and said edge of said disk provided by said exposed cutout, the internal clearance thickness of said enclosure is marginally greater than the external clearance thickness of said door, and said door is retracted inside said enclosure when said door is in open position, said cutout and said door when retracted providing access for a rotary actuator positioning a read/write head along an accurate path adjacent to said top surface and said bottom; and a locking mechanism for maintaining said door in said closed position, said locking mechanism mounted inside said door, said locking mechanism including a movable spring-loaded lever having a hook at a first end for engaging with said latch when said door is in said closed position.

2. The cartridge as in claim 1 wherein the facing edges of said door and the facing edges of said enclosure in the area adjacent to said cutout are chamfered to reduce interference when said door is moved from said open position to said closed position, and wherein the edges of said door and the edges of said enclosure in the area adjacent to said cutout overlap when said door is in said closed position to seal said cutout.

3. The cartridge as in claim 1 wherein said side surface of said door includes a notch to expose a second end of said lever, said notch to receive a pin for operating said locking mechanism.

4. The cartridge as in claim 3 wherein the thickness of said bottom casing is substantially less than the thickness of said top casing to permit the insertion of said disk on said bottom casing during assembly without interference with said bottom casing.

5. A disk storage device, comprising:

a rotary actuator having an arm mounted thereon, a read/write head mounted at a free end of said arm, said rotary actuator for positioning said read/write head along an arcuate path;

a disk cartridge including an enclosure having a top, a bottom, and a side, said side connecting said top and bottom, said enclosure having a segment shaped cutout formed by removal of a portion of said top, removal of a facing portion of said bottom, and removal of a portion of said side connecting said removed top portion and said removed bottom portion, said enclosure further including a disk mounted for rotation inside said enclosure, said disk exposed at a top surface, a bottom surface, and an edge within said segment shaped cutout, and said enclosure having a segment shaped door pivotally mounted on said enclosure, said segment shaped door generally U-shaped in cross section, said segment shaped door having a top surface to shield said top surface of said disk, a lower surface to shield said bottom surface of said disk, and a side surface to shield said edge of said disk, said segment shaped door having a closed position to fully seal said cutout, and said segment shaped door having an open position to fully expose said cutout, said cutout for providing access for said read/write head to said top surface, bottom surface, when said read/write head is positioned along said arcuate path by said rotary actuator while said cartridge is inserted in said disk drive, said enclosure having a spindle access hole surrounded by a magnet, and said disk having a metal washer to engage with said magnet when said disk is not in operation;

a guide plate mounted adjacent to said rotary actuator, said guide plate for receiving said cartridge, said guide plate for positioning said cartridge relative to said rotary actuator when said cartridge is inserted in said disk storage device; and a spindle assembly including a spindle shaft attached to a spindle motor for rotating said disk when said disk is inserted in the disk drive, and said spindle shaft is inserted in said spindle access hole.

6. The disk drive as in claim 5 wherein the internal clearance thickness of said enclosure is marginally greater than the external clearness thickness of said door, and wherein said door is retracted inside said enclosure when said door is in said open position.

7. The disk drive as in claim 6 wherein the facing edges of said door and the facing edges of said enclosure in the area adjacent to said cutout are chamfered to reduce interference when said door is moved from said open position to said closed position, and wherein the edges of said door and the edges of said enclosure in the area adjacent to said cutout overlap when said door is in said closed position to seal said cutout.

8. The disk drive as in claim 5 wherein said door pivots about an axis approximately coincident with the axis of rotation of said disk.

9. The disk drive as in claim 5 further having a locking mechanism for maintaining said door in said closed position.

10. The disk drive as in claim 9 wherein said locking mechanism includes a movable spring-loaded lever having hook at a first end, said lever pivotally mounted in said door, and wherein a fixed latch is formed on an interior surface of said enclosure, said hook to engage with said latch when said door in said closed position.

11. The disk drive as in claim 10 wherein said side surface of said door includes a notch to expose a second end of said lever, and wherein a pivotally mounted opening lever is mounted on said guide plate, said opening lever having a pin inserted in a free end thereof, said pin to fit in said notch of said door to operate said locking mechanism, said opening lever pivoting about its pivotal point to open and unlock said door when said door is inserted in said disk drive.

12. The disk drive as in claim 11 wherein said disk includes a central throughhole, and a plug fitted in said throughhole, and wherein said spindle shaft includes a second annular permanent magnet for attracting said washer to magnetically couple said disk to said spindle assembly.

13. The disk drive as in claim 11 wherein said rotary actuator includes a second arm having a second read/write head mounted thereon, said second read/write for accessing an opposing side surface of said disk.

14. A method for accessing a disk cartridge, comprising the steps of:
positioning a read/write head along an arcuate path, said read write/head mounted at a free end or an arm of a rotary actuator;
placing a disk cartridge in the path of said arcuate path, said disk cartridge including an enclosure having a top, a bottom, and a side, said side connecting said top and bottom, said enclosure having a segment shaped cutout formed by removal of a portion of said top, removal of a facing portion of said bottom, and removal of a portion of said side connecting said removed top portion and said removed bottom portion, said cartridge further including a disk mounted for rotation inside said enclosure, said disk exposed at a top surface, a bottom surface, and an edge within said cutout, and said cartridge having a segment shaded door pivotally mounted on said enclosure, said door generally U-shaped in cross section, said door having a top surface to shield said top surface of said disk, a lower surface to shield said bottom surface of said disk, and a side surface to shield said edge of said disk, said door having a closed position to fully seal said cutout, and said door having an open position to fully expose said cutout, said cutout for providing access for said read/write head to said top surface and said bottom surface of said disk when said read/write head is positioned along said arcuate path;
opening said door to expose said disk;
magnetically coupling said disk to a spindle assembly;
rotating said disk by means of said spindle assembly while positioning said read/write head; and
magnetically coupling a washer placed on said disk with a magnet positioned around an access hole for said spindle assembly to seal said access hole when said disk is not in operation.

15. A disk cartridge, comprising:
an enclosure having a segment shaped cutout formed by removal of a segment shaped portion said enclosure, a fixed latch formed on an interior surface of said enclosure, and said enclosure having a centrally located access hole surrounded by an annular magnet, a ferrous-washer attracted by said annular magnet when said cartridge is not in operation to seal said access hole;
a disk mounted for rotation inside said enclosure, a segment shaped portion of said disk exposed at a top surface, a bottom surface, and an edge by said segment shaped cutout, said ferrous-metal washer mounted on a central portion of one side surface of said disk in an opposing relationship with said annular magnet;
a segment shaped door pivotally mounted inside said enclosure, said segment shaped door having a closed position to fully seal said segment shaped cutout, said segment shaped door having an open position to enable access to said segment shape portion of said disk by a rotary actuator positioned along an arcuate path during operation of the cartridge; and
a locking mechanism for maintaining said door in said closed position, said locking mechanism including a lever for engaging with said latch.

16. A disk cartridge, comprising:
an enclosure having a top cover and a bottom cover, said enclosure having a segment shaped cutout;
a disk mounted for rotation inside said enclosure;
a segment shaped door mounted inside said enclosure, said door having a closed position to fully seal said cutout, said door having an open position to enable access to an exposed portion of said disk by an actuator during operation;
said bottom cover including a centrally located access hole for receiving a spindle to rotate said disk during operation, said access hole surrounded by an annular magnet fixed to said bottom cover, said disk including a ferrous metal washer fixed to the central portion of said disk, said annular magnet to attract said washer to seal said access hole when said disk is not in operation.

* * * * *